(12) United States Patent
Sivakumar et al.

(10) Patent No.: US 9,383,903 B2
(45) Date of Patent: Jul. 5, 2016

(54) SYSTEMS AND METHODS FOR PROVIDING PROGRAMMABLE MACROS

(76) Inventors: Raghupathy Sivakumar, Atlanta, GA (US); Sandeep Kukumanu, Atlanta, GA (US); Cheng-Lin Tsao, Atlanta, GA (US)

( * ) Notice: Subject to any disclaimer, the term of this patent is extended or adjusted under 35 U.S.C. 154(b) by 144 days.

(21) Appl. No.: 13/991,028

(22) PCT Filed: Dec. 12, 2011

(86) PCT No.: PCT/US2011/064469
§ 371 (c)(1),
(2), (4) Date: Mar. 5, 2014

(87) PCT Pub. No.: WO2012/079087
PCT Pub. Date: Jun. 14, 2012

(65) Prior Publication Data
US 2014/0289621 A1   Sep. 25, 2014

Related U.S. Application Data

(60) Provisional application No. 61/421,765, filed on Dec. 10, 2010.

(51) Int. Cl.
*G06F 15/00* (2006.01)
*G06F 13/00* (2006.01)
*G06F 3/0484* (2013.01)
*G06F 9/455* (2006.01)

(52) U.S. Cl.
CPC .......... *G06F 3/0484* (2013.01); *G06F 9/45512* (2013.01)

(58) Field of Classification Search
CPC .... G06F 9/45512; G06F 8/41; G06F 11/3414
USPC ......... 715/763–765, 738–740, 704, 838, 790, 715/864
See application file for complete search history.

(56) References Cited

U.S. PATENT DOCUMENTS

| | | | |
|---|---|---|---|
| 6,380,924 B1 | 4/2002 | Yee | |
| 2002/0188661 A1 | 12/2002 | Casais | |
| 2005/0278728 A1* | 12/2005 | Klementiev | 719/328 |
| 2006/0190806 A1* | 8/2006 | Sasson et al. | 715/500 |
| 2009/0106312 A1 | 4/2009 | Breslau et al. | |
| 2010/0088598 A1* | 4/2010 | Lee et al. | 715/704 |

* cited by examiner

*Primary Examiner* — Kevin Nguyen

(57) ABSTRACT

A system for providing improved efficiency in use of a mobile application can comprise a mobile application and a macro presenter on a mobile device, and a target platform the mobile application provides access to. The mobile application can comprise a front-end client and a user interface. The macro presenter can overlay a control panel over the user interface allowing the selection of a macro for playback. The target platform can comprise a server, a macro recorder capable of recording user interactions to create programmable macros, and a macro player capable of executing a macro. An exemplary embodiment of the target platform can further comprise a macro recommender capable of monitoring user interactions, identifying repetitive tasks, and suggesting programmable macros. The macro player can execute a programmable macro without user interaction or can pause to receive user input. Macros can be retrieved from and stored in a macro repository.

23 Claims, 11 Drawing Sheets

SYSTEMS AND METHODS FOR PROVIDING PROGRAMMABLE MACROS

CROSS-REFERENCE TO RELATED APPLICATIONS

This application claims priority and the benefit under 35 U.S.C. §119(e) of U.S. Provisional Patent Application 61/421,765, filed Dec. 10, 2010. The entire contents and substance of which are hereby incorporated by reference.

BACKGROUND OF THE INVENTION

1. Field of the Invention

Various aspects of the present invention relate to the use of programmable macros and, more particularly, to providing improved efficiency in user interactions on devices used to access remote computing resources.

2. Description of Related Art

Mobile devices typically lack the processing power and storage capacity of traditional computers. Because of these constraints, mobile devices are often used to access remote computing resources, which often provide greater processing power and storage capacity. Such remote computing resources include applications installed on a personal computer (PC) and accessed through remote desktop software.

Many mobile device users rely on remote computing software on their mobile devices to access a PC or virtual desktop infrastructure (VDI). Unfortunately, remote computing software available for mobile devices is often ported on an as-is basis from corresponding PC counterparts and hence does not provide a satisfactory user experience. The unique limitations of mobile devices, particularly smartphones and personal digital assistants (PDAs), can impose substantial operational overheads on the user, making even mundane tasks burdensome. Remote computing from a mobile device can be significantly more difficult because of device constraints often including a small form-factor and screen size, and the lack of a physical mouse or keyboard.

One way to reduce burdensome overhead is by enabling common sequences of user operations to be performed in aggregate. The notion of operation aggregation is related to the concept of a macro, which is a sequence of instructions that has been recorded and can be replayed by the user. Two common types of macro solutions that exist today are raw macros and application macros.

Raw macros record and replay raw activities such as keystrokes and mouse clicks at specified coordinates. An example of a raw macro system is AutoHotkey. Although raw macro software can record macros generically across applications, such macros cannot be replayed robustly. Since raw macros are defined by system variables, a raw macro could fail to replay the intended task if the system environment during replay is not precisely the same as the recorded state. For example, a moved or resized window could cause a mouse click replayed at a recorded coordinate to activate a different function. Raw macros cannot respond to adaptive user interfaces, such as truncated menus that show frequent items in Microsoft® Office™ and other applications, as the location of items can change with use. The pacing of raw macro replay can also be problematic as the availability of the next function to invoke can be delayed due to the current computational load, or an unexpected dialog box. Since raw macros have no information regarding the application context, they cannot respond appropriately.

Raw macros are in contrast to application macros. Application macros are provided by the application developers in certain application software. One of the most popular application macros is the macro system within Microsoft® Excel™. Excel allows users to record their operations in the form of a Visual Basic™ script. Another example is iMacros®, a browser plug-in that allows users to record their operations when browsing the web.

Although application macros are robust at runtime, application macro software can only record macros specific to the recording application; thus, the scope of application macros is limited. For example, an application macro cannot work across multiple applications. Further, as the ability to record application macros is a feature of the application software itself, a user must rely on the application developer to provide such functionality. For this reason among others, some functions of an application may not be captured by the macro system. For example, iMacros® does not record the operation of printing a web page.

Thus, conventional macro systems fail to provide a generic and robust solution for aggregating user interactions on mobile devices.

SUMMARY

There is a need in the art for a programmable macro system that provides the recording of robust macros in and across application software running on a target platform. There is a further need for such a programmable macro system to allow the extensibility of macros at runtime. There is a further need for such a programmable macro system to analyze user behavior and suggest one or more macros based on a repetitive pattern of user behavior. There is also a need for a macro presentation system to present programmable macros in a simple and user-friendly manner to reduce user burden. It is to such programmable macro systems, devices, and methods that various embodiments of the present invention are directed.

Briefly described, various exemplary embodiments of the present invention include programmable macro systems, devices, and methods providing improved efficiency in the use of mobile devices to access remote computing resources. The programmable macro system can comprise a mobile application on a mobile device, the mobile application comprising a front-end client and an interface, and a target platform comprising a server application. A target platform can host a computing resource that a user of a mobile device desires to access. In some embodiments, communication between the mobile device and target platform is asynchronous. This can prevent the interface of the mobile application from becoming unresponsive to user interactions due to waiting for communication between the mobile device and target platform.

In an exemplary embodiment, the programmable macro system can further comprise one or more of various components, including a macro presenter, a macro recorder, a macro player, and a macro recommender. To facilitate the interoperation of various components of the programmable macro system, the system can additionally comprise a macro repository. The macro repository can reside in persistent storage on the mobile device, on the target platform, or at another location.

The macro presenter, if included, can run at least partially on the mobile device. The macro presenter can retrieve macros and request the macro player, which can reside at least partially on a target platform, to execute a selected macro from the retrieved macros. The retrieved macros can be programmable and can be retrieved from the macro repository. The macro presenter can overlay a control panel presenting the retrieved macros over an interface of the mobile application for a user to select. The macros can be presented as organized by the order in which the macros were recorded, the identity of the software application in which each macro was recorded, frequency of playback, or other means of organization. During execution of a macro, the macro presenter can cause the mobile application to enlarge a portion of the display of the mobile application to focus on a region of interest. The region of interest can require a user input or can be a pop-up window.

The macro recorder can record programmable macros. When a sequence of user interactions is performed, the recorder can classify each user interaction as a parameter or non-parameter operation. A parameter operation can be a user interaction within a recorded sequence, where that interaction includes a value that can change upon replaying of the sequence. The changeable value can therefore be considered a parameter. Each user interaction can be classified as parameter or non-parameter based on the type of graphical user interface (GUI) element accessed during that interaction. For example, and not limitation, if the GUI element is a text field, then the macro recorder can classify that interaction as a parameter operation, where the parameter is the text entered into the text field. The macro recorder can record a corresponding default value for each user interaction deemed a parameter operation, and it can create a macro from the sequence of operations. The macro recorder can store the created macro in the macro repository.

The macro player can execute a selected macro on the target platform or, in some embodiments, on the mobile device itself, and the macro player can handle exceptions that arise during execution of the selected macro.

In some embodiments, the macro presenter can present a macro execution menu during playback of a macro. The macro execution menu can allow a user to control the state of macro playback by requesting the macro player to pause or resume execution.

In some embodiments, the macro player can execute the selected macro in continuous mode or dynamic mode. If a user prompts the macro player to execute a selected macro in continuous mode and the macro is programmable, the macro player can automatically proceed with all default values for the parameter operations in the programmable macro. If the selected macro is a programmable macro and played in dynamic mode, the macro player can pause execution of the selected macro upon a parameter operation. During the pause, the macro player can accept user input or, at the user's prompting or after a predetermined time period, proceed with the corresponding default value for that parameter operation. After the parameter value is filled, the macro player can continue playing the remainder of the macro. In an exemplary embodiment, during the pause, the user can prompt the macro player to execute the remainder of the programmable macro without further user input, with all default values, for the remaining parameter operations.

If there is no recorded default value for a particular parameter operation during execution of a programmable macro, the macro player can pause execution for that reason and accept user input. The macro player can then proceed to the next step of the macro and, in some embodiments, the received input can be recorded as the corresponding default value of that parameter operation.

The macro recommender, if included, can run as a background process on the target platform. The macro recommender can run independently from the server application. In some embodiments, the macro recommender can automatically monitor user interactions to provide a sequence of user interactions, even when the macro recorder is not activated.

The macro recommender can analyze a history of user behavior and suggest macros for the user to create based on repetitive patterns of user activity. The macro recommender can classify each user interaction in a sequence of user interactions as a parameter or non-parameter operation by the type of GUI element accessed during each interaction, can identify any repetitive tasks within the sequence of user interactions, and can create a report of the repetitive tasks on demand. The macro recommender can identify repetitive tasks within an application, across multiple applications, or both. For example, and not limitation, a task across applications identified by the macro recommender might comprise opening a vCard in a first remote application, extracting an address from the vCard, then viewing the address in a second remote application such as Google® Maps™.

The macro recommender can organize the report of repetitive tasks in rank order. Based on the order, the macro recommender can select tasks, and recommend that a macro be created for the selected tasks.

These and other objects, features, and advantages of the invention will become more apparent upon reading the following specification in conjunction with the accompanying drawing figures.

DETAILED DESCRIPTION

To facilitate an understanding of the principles and features of the invention, various illustrative embodiments are explained below. In particular, the invention is described in the context of being a programmable macro system providing improved efficiency in user interactions with a mobile device, to access an application running on a remote computing device. Embodiments of the invention, however, are not limited to mobile devices or to applications running on remote computing devices. Rather, embodiments of the invention may be used for providing improved efficiency in use of various computing devices to access various computing resources. For example, and not limitation, some embodiments of the invention can improve efficiency of access to local resources, as well as access to remote resources, such as software-as-a-service applications provided by a cloud platform, native applications installed on a second mobile device, tablets, netbooks, e-readers, and portable game consoles.

Figure 11:
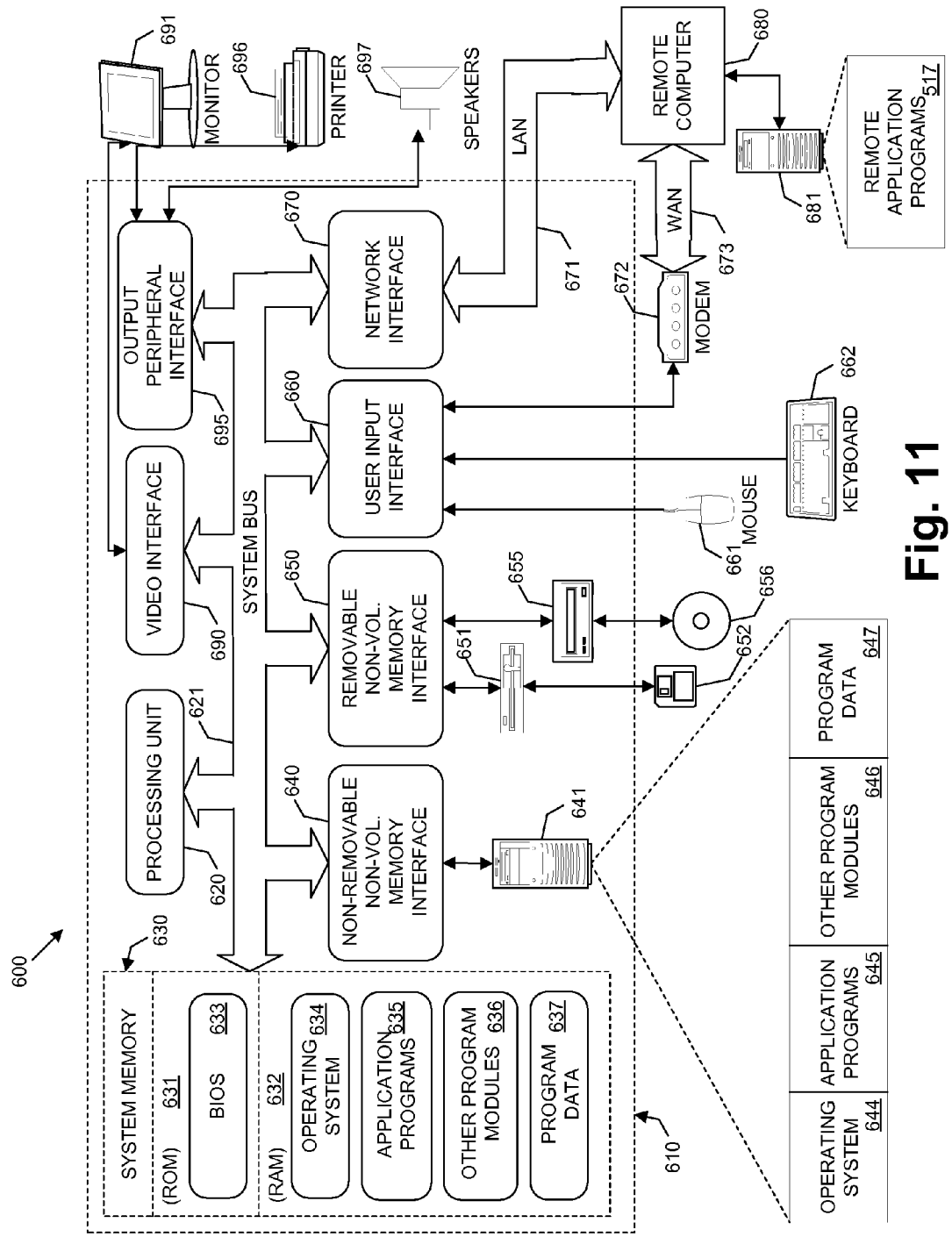
FIG. 11 illustrates an architecture of a suitable target platform or device that can be used in the programmable macro system, according to an exemplary embodiment of the present invention.

Throughout this disclosure, the present invention is described as embodied partially in a mobile device. However, those of skill in the art will recognize that the concepts of the invention are not limited to mobile devices and could be applied to various other computing devices 600 (FIG. 11). Accordingly, reference to mobile devices is for convenience and illustration, and such references should not be considered limiting. For example, and not limitation, embodiments of the present programmable macro system can be implemented on personal computers, public kiosks, or mainframes.

The components described hereinafter as making up various elements of the invention are intended to be illustrative and not restrictive. Many suitable components that would perform the same or similar functions as components described herein are intended to be embraced within the scope of the invention. Such other components not described herein may include, but are not limited to, for example, components developed after the invention.

Various embodiments of the present invention comprise programmable macro systems providing improved efficiency in use of mobile devices to access remote computing resources. Referring now to the figures, in which like reference numerals represent like parts throughout the views, various embodiments of the programmable macro system will be described in detail.

Figure 1:
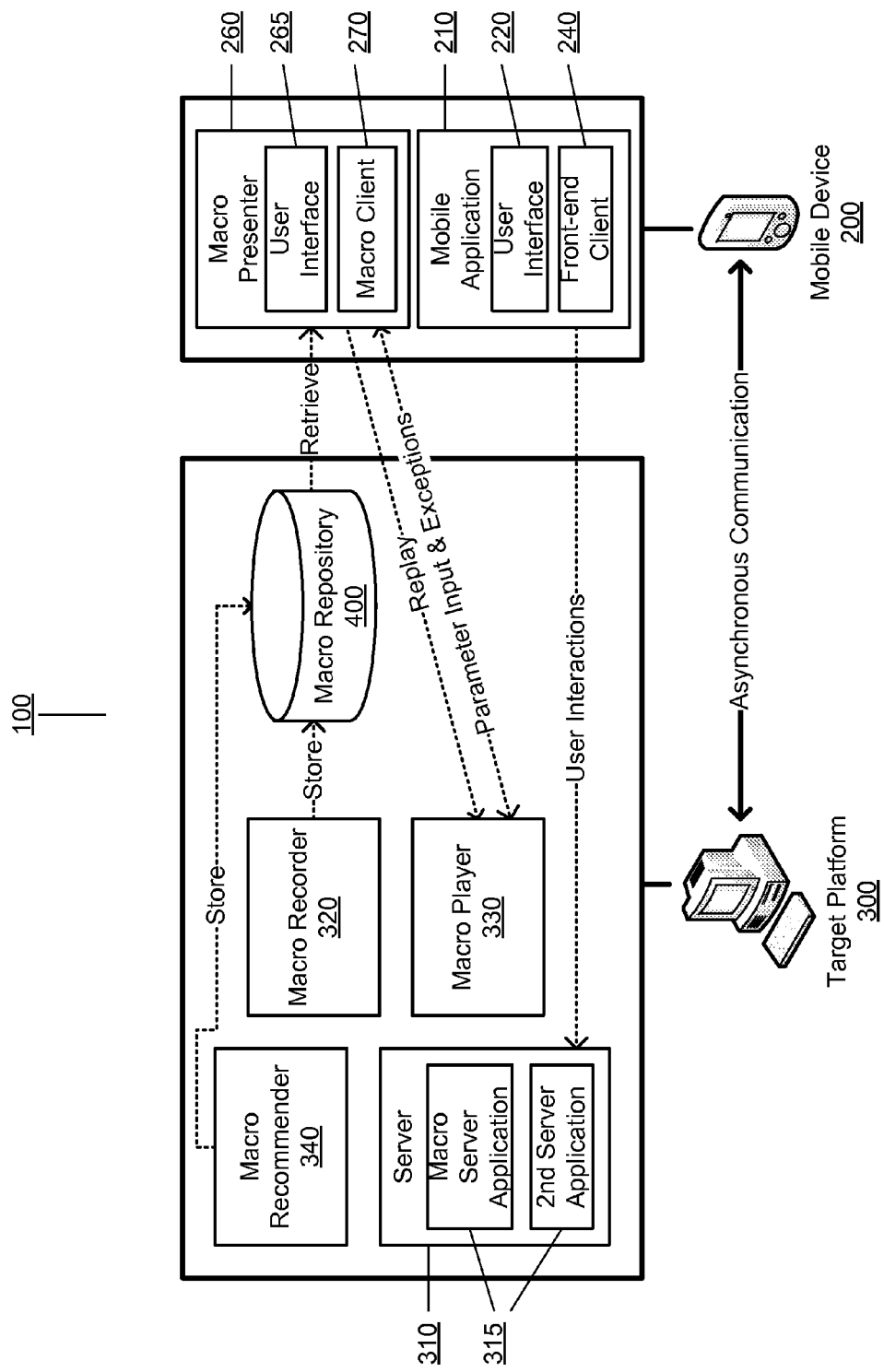
FIG. 1 illustrates a block diagram of a programmable macro system as used on a mobile device to access a target platform, according to an exemplary embodiment of the present invention.

FIG. 1 illustrates a block diagram of a programmable macro system 100 as used on a mobile device 200 to access a target platform 300, according to an exemplary embodiment of the present invention. As shown in FIG. 1, an exemplary programmable macro system 100 can comprise a mobile device 200 in communication with a target platform 300. A user can use the mobile device 200 to access computing resources on the target platform 300. The programmable macro system 100 can aggregate user interactions inputted on the mobile device 200 in order to reduce the burden of accessing computing resources on the target platform 300. By reducing the number of user interactions required to complete a task, the programmable macro system 100 can provide increased efficiency in accessing remote computing resources from mobile devices.

The mobile device 200 can be, for example and not limitation, a smartphone such as an iPhone® or Android™, BlackBerry®, Symbian®, Palm OS®, or Windows Mobile® device; or another mobile device form factor such as a personal digital assistant (PDA), tablet, netbook, e-reader, portable game console, laptop, or other computer.

The target platform 300 and corresponding computing resources can be, for example and not limitation, applications on a personal computing device, applications provided by a virtual desktop infrastructure (VDI), software-as-a-service applications provided by a cloud platform, web-based services, or even native applications installed on another mobile device. The target platform 300 can be local or remote to the mobile device 200. In some embodiments, the mobile device 200 of the programmable macro system 100 can be the target platform 300. The mobile device and target platform can be, in whole or in part, embodied in one or more computing devices 600 (FIG. 11).

In various embodiments, the mobile device 200 and the target platform 300 can communicate over the Internet. One or both of the mobile device 200 and the target platform 300 can have a static internet protocol (IP) address. In some embodiments, the mobile device 200 and target platform 300 can communicate, for example and not limitation, over a local area network (LAN), wireless local area network (WLAN), a wide area network (WAN), or storage area network (SAN). In some embodiments, the mobile device 200 and target platform 300 can be directly connected by means of a wired or wireless connection. Wired connections include, but are not limited to, universal serial bus (USB), null modem, Ethernet, and optical fiber connections. Wireless connections include Bluetooth®, various 802.11 standards, WiMAX™, and infrared technologies.

In various embodiments, communication between the mobile device 200 and target platform 300 can be performed asynchronously. This can prevent the user interface 220 of the mobile application 210 from becoming unresponsive to user interactions due to waiting for communication between the mobile device 200 and target platform 300. For example, during the execution of a macro, the mobile application 210 can remain responsive to user interactions.

Figure 3:
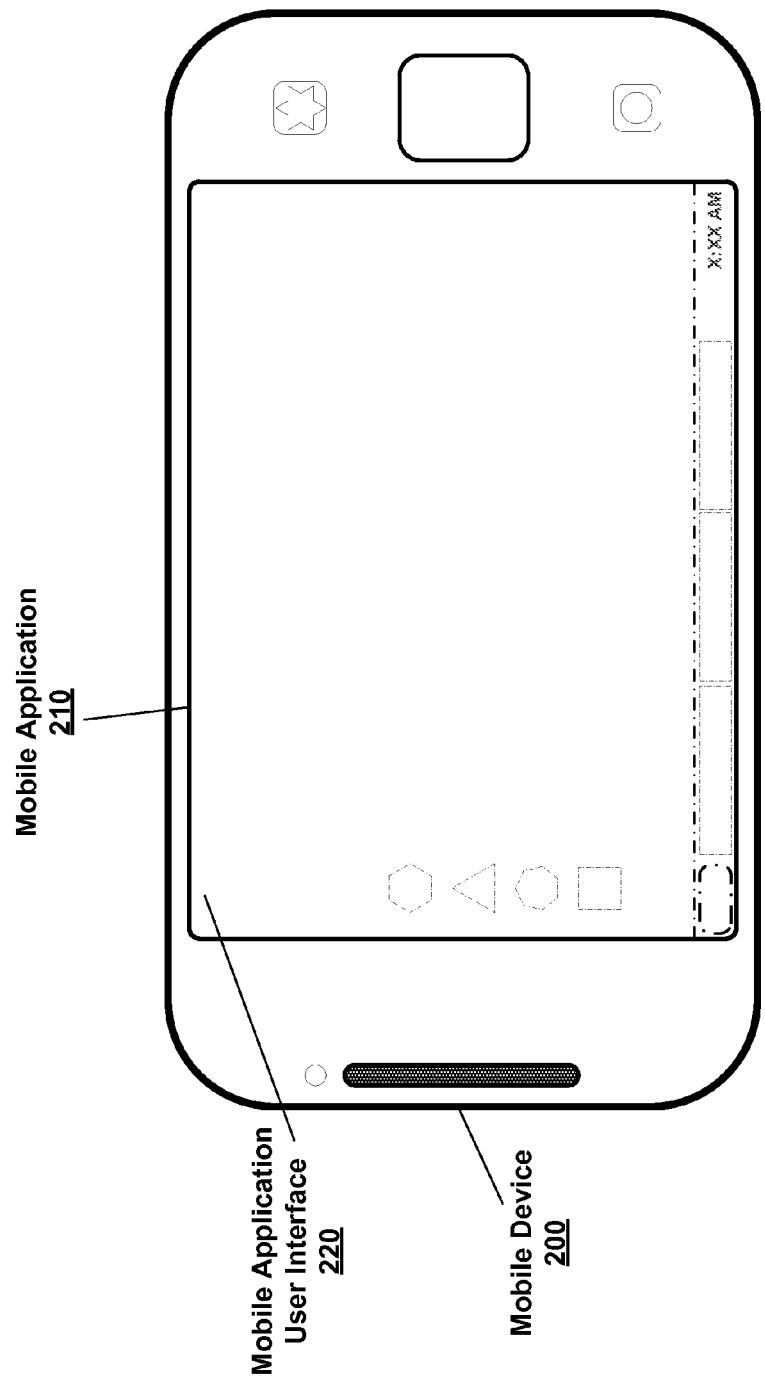
FIG. 3 illustrates a mobile application on a mobile device, according to an exemplary embodiment of the present invention.

FIG. 3 illustrates a mobile application 210 on a mobile device 200, according to an exemplary embodiment of the present invention. As shown, the mobile device 200 can comprise a mobile application 210 comprising a user interface 220. The mobile application can further comprise a front-end client 240 in communication with a server 320 on target platform 300 or associated with the target platform 300. The mobile application 210 can comprise, for example and not limitation, a remote desktop client such as VNC® Viewer or a virtual desktop client such as Citrix Receiver™, or a web-based application such as Google Apps™. The user interface can be a graphical user interface (GUI), a touch user interface, a command line interface, a web-based user interface, or some other interface. In some embodiments, a mobile device can comprise one more applications. Each application can have its own user interface 220, and share or have its own front-end client 240.

In various embodiments, the mobile device 200 can also comprise a macro presenter 260. The macro presenter 260 can retrieve macros and request the macro player 330 on a target platform 300 to execute a selected macro from the retrieved macros. A user can interact with the macro presenter 260 through its user interface 265. The user interface 265 of the macro presenter 260 can display control panels overlaid on top of the mobile application 210. The macro presenter 260 can comprise a user interface 265 and a macro client 270 capable of communicating with the server 310. In some of these embodiments the macro presenter is integrated into the mobile application 210. An integrated macro presenter 260 and mobile application 210 can share a user interface and a client in communication with the server 310.

The target platform 300 can comprise a server 310 for communicating with the mobile device 200. The target platform 300 can also comprise a macro recorder 320, a macro player 330, and a macro recommender 330. The programmable macro system 100 can also comprise a macro repository 290 capable of storing macros.

The server 310 can comprise, for example and not limitation, a remote desktop server application, VDI server application, or a secure shell server application. In some embodiments not pictured, the server 310 can be an integrated solution, comprising an integrated server application capable of communicating with the macro client 265 of a macro presenter 260 on the mobile device 200, and communicating with a front-end client of at least one mobile application 210 on the mobile device 200. In other embodiments, the server 310 can comprise one or more server applications 315 in communication with the mobile device 200, wherein one of the server applications is capable of communication with the macro client 265 of the macro presenter 260, and one or more of the server applications 315 is capable of communication with one or more front-end clients on the mobile device 200. In some embodiments, the server applications 315 on the target platform 300 are integrated, and the mobile application 260 and macro presenter 260 are integrated.

Figure 2:
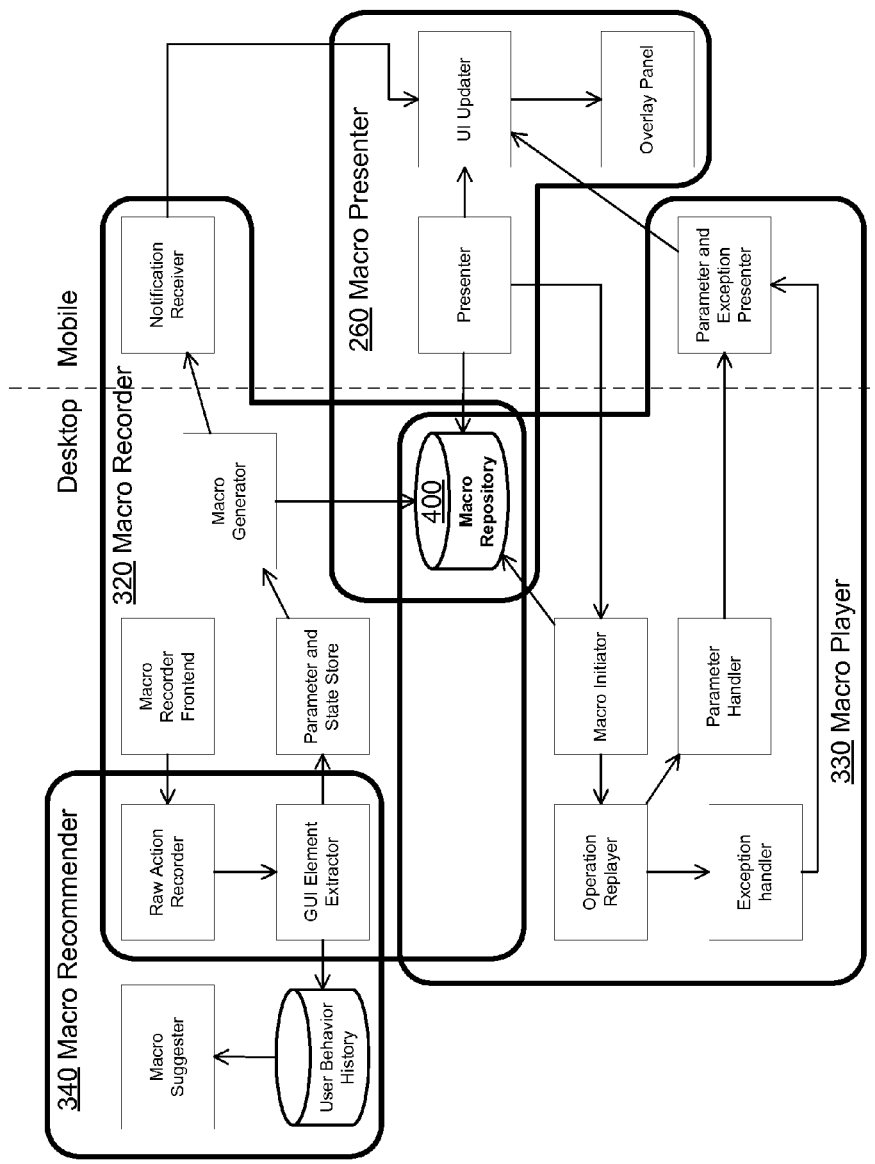
FIG. 2 illustrates a block diagram of components of the programmable macro system as used on a mobile device to access a target platform, according to an exemplary embodiment of the present invention.

FIG. 2 illustrates a block diagram of components of the programmable macro system 100 as used on a mobile device 200 to access a target platform 300, according to an exemplary embodiment of the present invention. As shown in FIG. 2, an exemplary programmable macro system 100 can comprise a macro recorder 320, a macro player 330, a macro recommender 330, macro presenter 240, and a macro repository 400. Each of these components of the programmable macro system 100 can comprise hardware, software, or a combination thereof. Although these components are described as being distinct, it will be understood that the distinction is provided for illustrative purposes only, and the hardware or software used to implement these components can overlap or be divided in other manners.

A. The Macro Recorder

The macro recorder 320 can allow a user to record a sequence of operations on the target platform 300 resulting from user interactions in the mobile application 210 on the mobile device 200. For example, and not limitation, a sequence of operations might comprise the steps of: opening a file in an accounting program, exporting the file to different file format, uploading the file to a remote server, and closing the accounting program. The macro recorder 320 can aggregate these operations into a macro. A user can complete the same series of operations by executing the resulting macro with the macro player 330.

The macro recorder 320 can record programmable macros. In some embodiments, the macro recorder 320 can also record raw macros, which can record and replay raw activities such as keystrokes and mouse clicks at specified coordinates. Programmable macros can be robust at runtime like application macros, and can work in and across application software running on a target platform 300, like raw macros. In some embodiments, programmable macros can be executed with dynamic user input or extended at run-time to include new operations, or to exclude operations.

Figure 7:
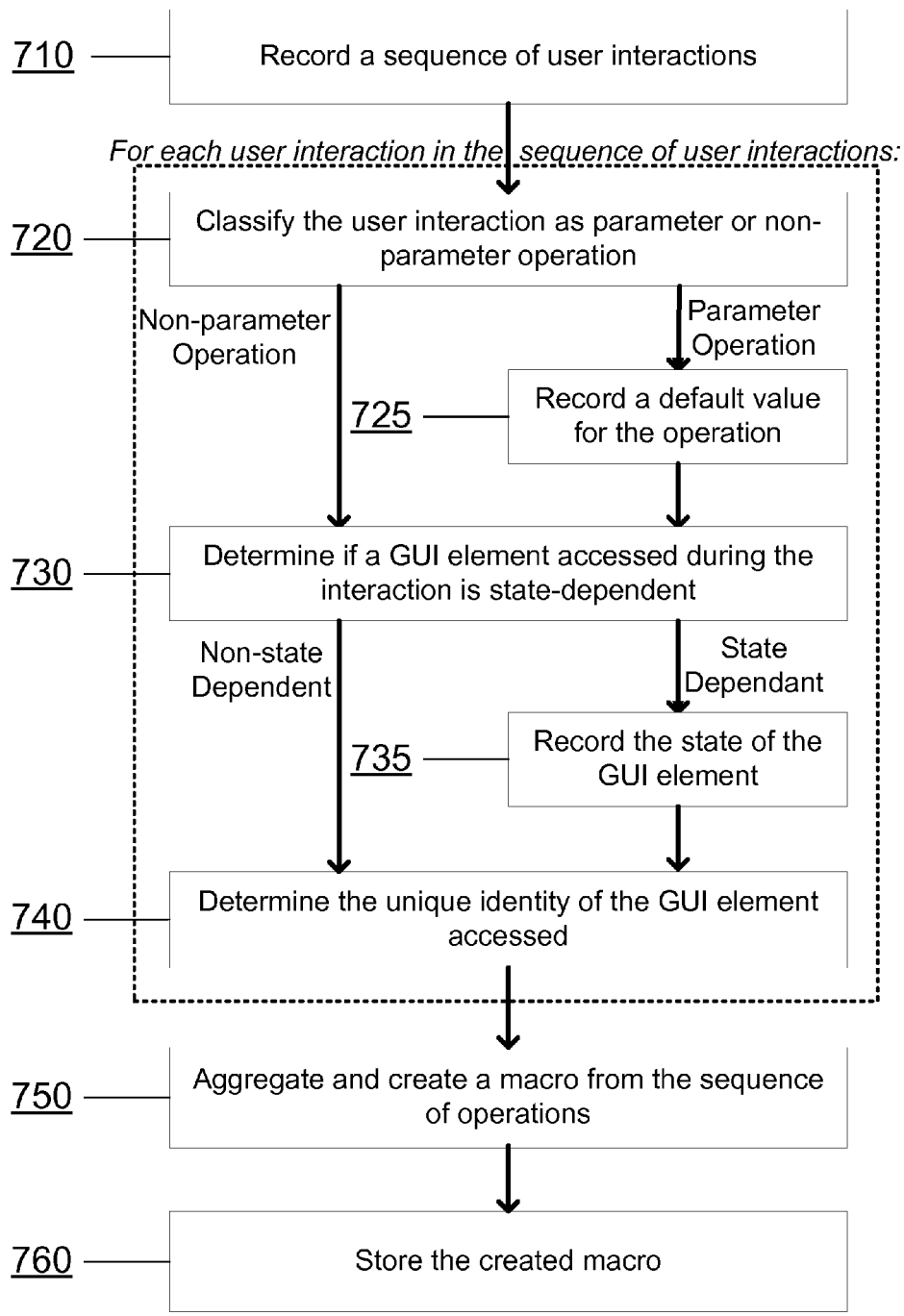
FIG. 7 illustrates a flow diagram of a process of recording a programmable macro, according to an exemplary embodiment of the present invention.

FIG. 7 illustrates a flow diagram of a process of recording a programmable macro, according to an exemplary embodiment of the present invention. As shown in FIG. 7, the macro recorder 320 can record a sequence of raw user interactions 710. The macro recorder 320 can classify each user interaction as a parameter or non-parameter operation 720. A parameter operation can be a user interaction within a recorded sequence, where that interaction includes a value that can change upon replaying of the sequence. The changeable value can therefore be considered a parameter.

To classify a user interaction as a parameter or non-parameter operation 720, the macro recorder 320 can identify a GUI element accessed by a raw action. In some embodiments, application programming interfaces (APIs) provided by accessibility frameworks can be used to extract a handle for the GUI element. In Microsoft® Windows®, the UI Automation (UIA) framework provides functions to determine the AutomationElement for mouse and keyboard entries. The AutomationElement provides access to common properties of user interface elements, for example, the name of a user interface element. Other examples of accessibility frameworks include but are not limited to SAP GUI Scripting for SAP and Java Accessibility Utilities.

Each user interaction can be classified as parameter or non-parameter based on the type of GUI element accessed during that interaction. In some embodiments, parameter operations can change the state of a GUI element with a user-inputted value, while non-parameter operations can invoke a function associated with a GUI element. For example, and not limitation, if the GUI element is a text field, then the macro recorder can classify the associated interaction as a parameter operation, where the parameter is the text entered into the text field.

In some embodiments, operations on a text field, check box, combo box, edit, list item, and radio button are considered parameter operations. An operation that does not vary between instances of replaying task can be a non-parameter operation. For example, clicking a scroll bar button can invoke the same scroll function every time the programmable macro is executed. Non-parameter operations can include but are not limited to operations on a button, document, list menu, menu item, pane, or scroll bar.

If the user interaction is classified as a parameter operation, the macro recorder 320 can record current or previous user input as a default value 725 to use as a parameter when the parameter operation is executed as part of a macro. The macro recorder 320 can also record the state of a GUI element. In some embodiments the macro recorder 320 can only record the state of a GUI element whose function is state-dependent. For example, a mouse click operation on a check box can have different results depending on the state of the checkbox prior to the operation. The macro recorder 320 can determine whether the GUI element accessed during the user interaction is state-dependent 730 and, if so, record the state of the GUI element 735.

The macro recorder 320 can retrieve a unique identity for the GUI element 740 so that the GUI element can be reliably located while executing a recorded macro. The AutomationElement has several properties that may be used to identify a GUI element, such as name or automation identification (ID). However, even a combination of these properties may not be sufficient to uniquely identify an element. Automation ID is not provided by all GUI elements, and multiple GUI elements in a GUI application window can have the same name. The macro recorder 320 can instead trace the GUI tree hierarchy from the target GUI element back to the root and can use the full ancestor list as the unique identity.

When a user is finished recording a macro, the macro recorder 320 can aggregate and create a macro from the sequence of operations 750 performed by the user. The created macro can be a dynamic array of GUI element information recorded for each operation. In some embodiments, each entry in the array is self-sufficient to replay the necessary operation; and the information stored can contain, for example, the process on which an operation is performed, the unique identity of the GUI element so that it can be retrieved, the GUI element's state, and the operation performed. The user can provide a name for the macro and the macro recorder 320 can store the macro. In some embodiments, the macro recorder 320 can store the macro 760 in a macro repository.

B. The Macro Presenter

The macro presenter 260 can retrieve macros and request the macro player 330 on a target platform 300 to execute a macro selected from the retrieved macros. The retrieved macros can be programmable. In some embodiments, the macros can be retrieved from the macro repository 290.

Figure 5:
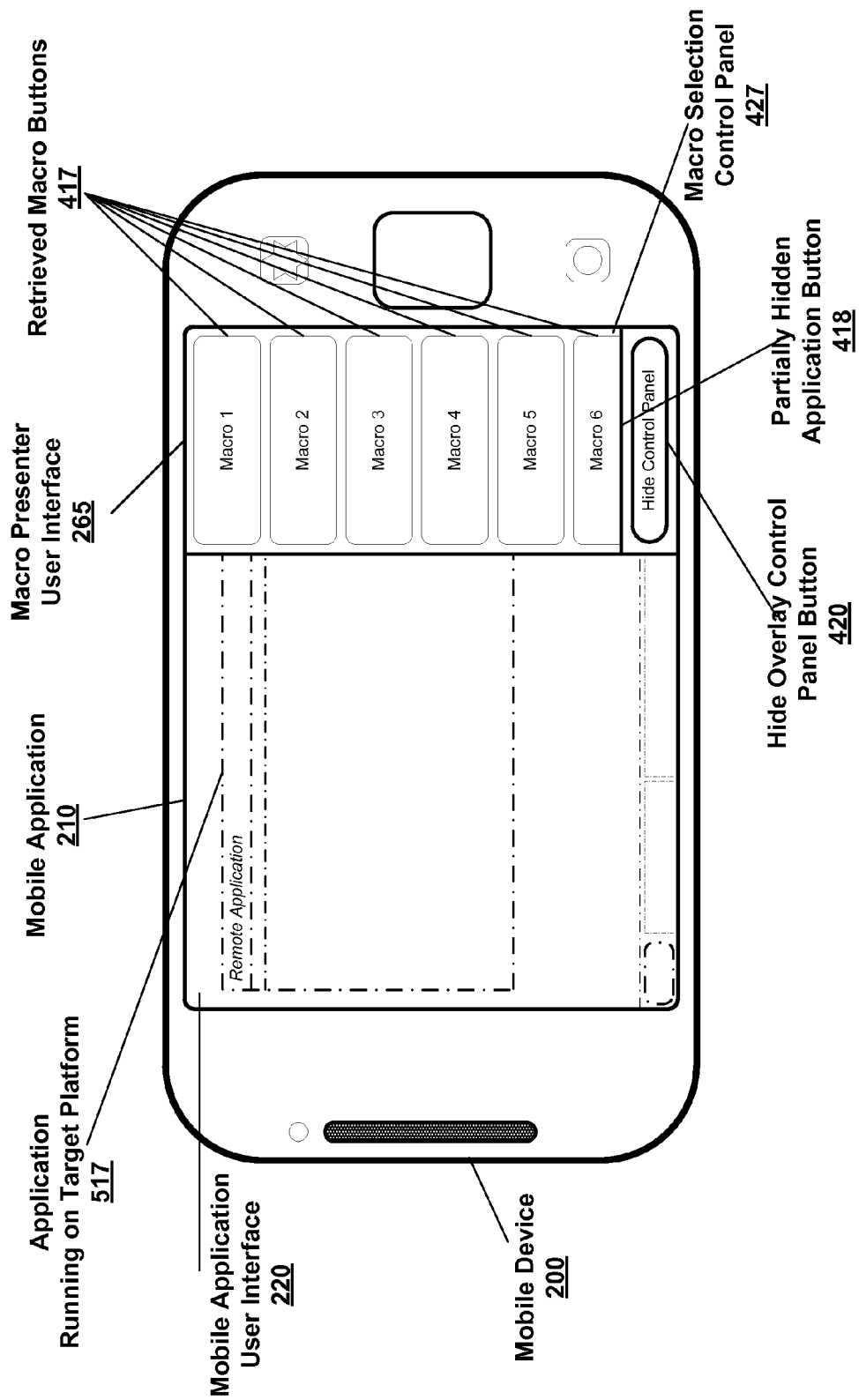
FIG. 5 illustrates a macro selection control panel of the macro presenter of the programmable macro system, according to an exemplary embodiment of the present invention.

The macro presenter 260 can, through its user interface 265, overlay a macro selection control panel 427 presenting the retrieved macros over the user interface 220 of the mobile application 210, enabling a user to select a macro for playback. FIG. 5 illustrates a macro selection control panel 427 of the macro presenter 260 of the programmable macro system 100, according to an exemplary embodiment of the present invention. As described above, in some embodiments, the macro presenter 260 can share an interface with the mobile application 210.

A control panel 426-428 of the macro presenter 260 can be hidden by activating a hide control panel button 420. The control panel 426-428 can be displayed again by activating a show control panel button when the control panel 426-428 is hidden. In some embodiments, the hide control panel button 420 and show control panel button may be the same button, responding accordingly depending on the state of the overlay control panel 420. For example and not limitation, the show/hide control panel function can be bound to a hardware button on the mobile device 200. If the hardware button is pressed and the control panel 426-428 is hidden, the macro presenter 260 can display the overlay control panel. If the hardware button is pressed and the control panel 426-428 is visible, the macro presenter 260 can hide the control panel.

Figure 4:
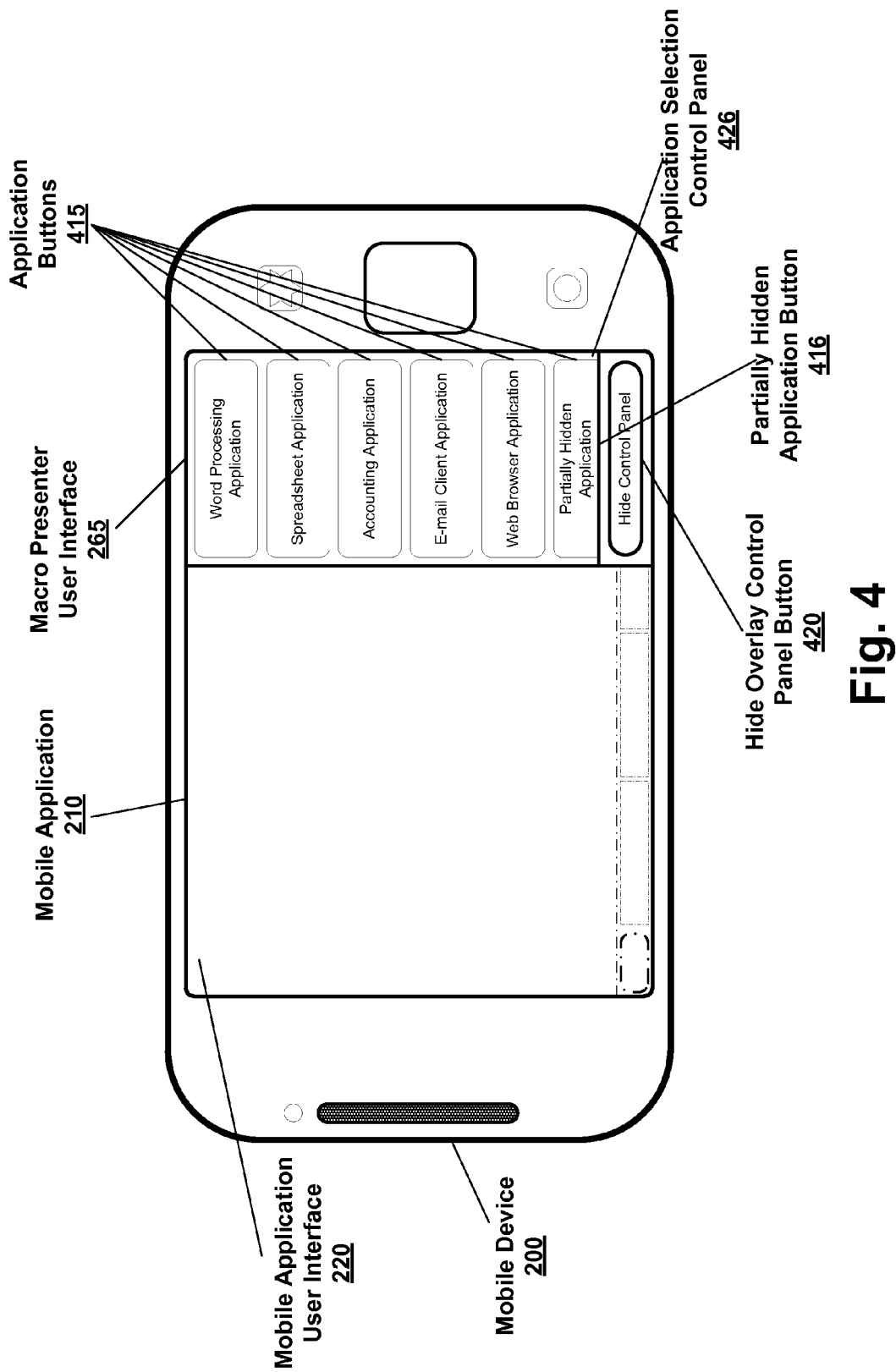
FIG. 4 illustrates an application selection control panel of a macro presenter of the programmable macro system, according to an exemplary embodiment of the present invention.
Figure 6:
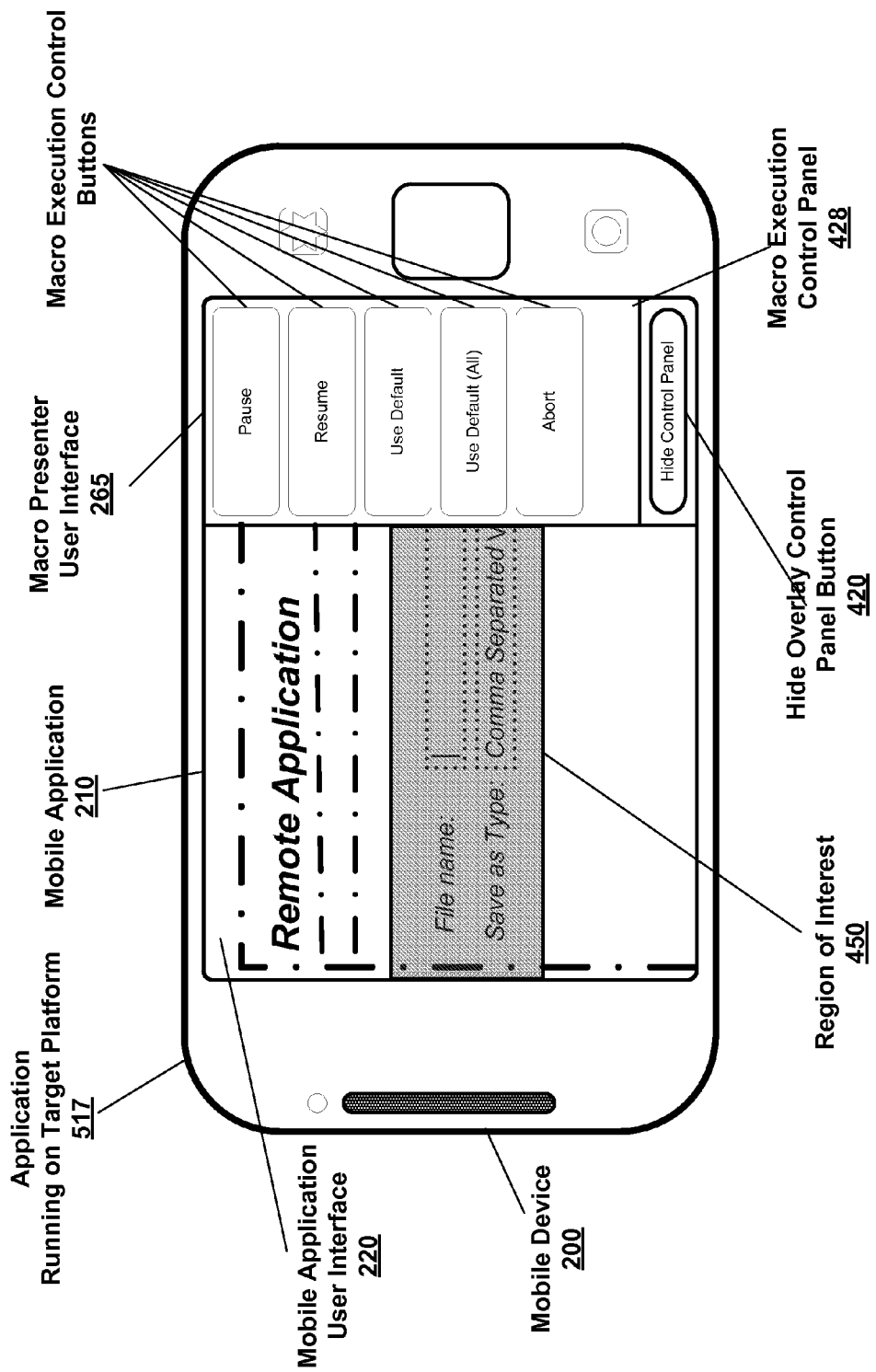
FIG. 6 illustrates a mobile application on a mobile device where the display of the mobile application is enlarged to show a region of interest of an application running on a target platform, according to an exemplary embodiment of the present invention.

In some embodiments, the macro presenter 260 can present the retrieved macros on the user interface 265 of the macro presenter 260 as organized by the identity of the remote or local application 517 in which each macro was recorded. The macro presenter can also present the retrieved macros as organized by the order in which the macros were recorded, frequency of playback, or other means of organization. FIG. 4 illustrates an application selection control panel 426 of a macro presenter 260 of the programmable macro system 100, according to an exemplary embodiment of the present invention. When a user activates an application button 415 for a specific application, the macro presenter 260 can present a list of macros corresponding to that application. Upon activation of an application button 415, the macro presenter 260 can start up the corresponding application 517 on the target platform 300, preferably automatically, as shown in FIG. 5. During execution of a macro, the macro presenter 260 can cause the mobile application 210 to enlarge a portion of the display of the mobile application 210 to focus on a region of interest 450. The region of interest 450 can require a user input or can be a pop-up window. FIG. 6 illustrates a mobile application 210 on a mobile device 200 where the display of the mobile application 210 is enlarged to show a region of interest 600 of an application 517 running on a target platform 300, according to an exemplary embodiment of the present invention.

In some embodiments, during execution of a macro, the macro presenter 260 can display a macro execution control panel 428 as shown in FIG. 6. The macro execution user interface 265 can enable a user to control the pace of macro playback by requesting the macro player 330 to pause or resume execution. In some embodiments, the macro presenter 260 and macro player 330 can enable a user to step through a macro by a predetermined number of operations at a time. In those embodiments, the interface 265 of the macro presenter 260 can provide appropriate controls.

In some embodiments, macros can be extended according to an exemplary embodiment of the invention using the macro execution control panel 428 to control execution of a macro. A user can pause the execution of a macro, in some embodiments by using controls on a user interface 265 provided by the macro presenter 260. During the pause, the interface of the mobile application can still respond to user interactions, enabling a user to interact with the application running on the target platform 517. By pausing execution of the macro, performing at least one more user interactions, and resuming the macro, a user can add intermediate steps to the macro. In some embodiments, the newly-extended macro can be recorded, either as modifications to the original macro or as a new macro.

C. The Macro Player

The macro player 330 can execute a macro on the target platform 300 or, in some embodiments, on the mobile device 200 itself. In some embodiments, the macro player can use an automation framework to execute the operations of a macro, for example and not limitation, the Microsoft UIA framework. In an exemplary embodiment, the macro player 330 can handle exceptions that arise during execution of the macro.

The macro player 330 can execute a programmable macro, which can be executed in various modes. In continuous mode, the macro player 330 can automatically execute the entirety of a macro using default values for parameter operations. When the macro player 330 encounters a parameter operation, the default value for the parameter can be used automatically so that execution continues.

Figure 8:
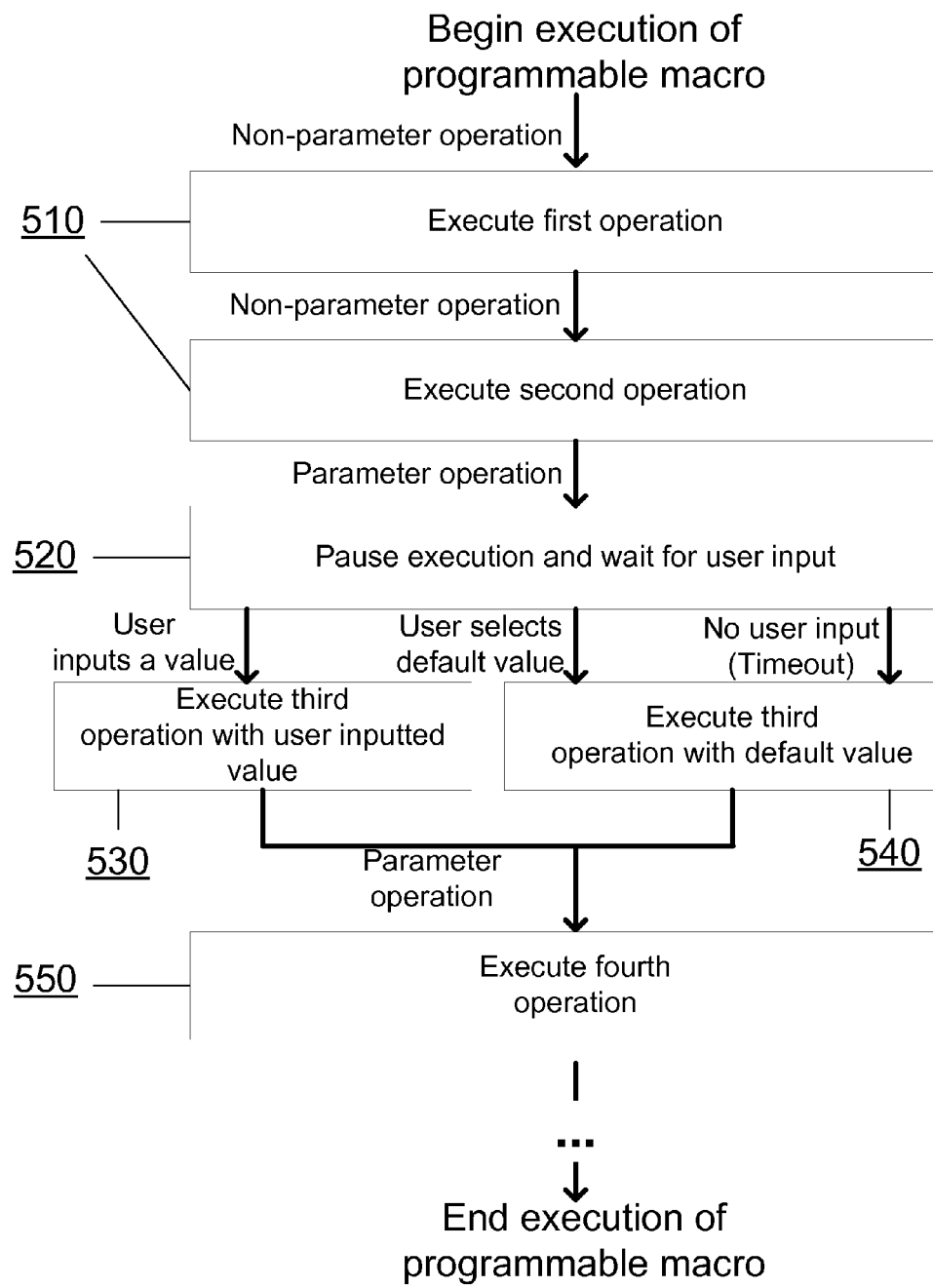
FIG. 8 illustrates a flow diagram of a process of executing a programmable macro in dynamic mode, according to an exemplary embodiment of the present invention.

FIG. 8 illustrates a flow diagram of a process of executing a programmable macro in dynamic mode, according to an exemplary embodiment of the present invention. In dynamic mode, when the macro player 330 encounters a parameter operation, the macro player 330 can pause execution to allow a user to enter a value for the parameter on the fly 520, as shown in FIG. 6. Alternatively the user may choose to continue execution with the default value for the parameter 540. In some embodiments, as shown in FIG. 6, a user can activate an option instructing the macro player 330 to proceed with default values for the remainder of execution of a programmable macro. In an exemplary embodiment, a user can be allowed a predetermined amount of time to enter a parameter value before the macro player 330 automatically proceeds with the default value 540.

If the macro player 330 is executing a programmable macro and there is no recorded default value for a particular parameter operation, then the macro player 330 can pause execution to accept user input in that case. The user interface 265 of the macro presenter 330 can disable the button allowing a user to proceed with a default value. After a user inputs a value, the macro player can then proceed to the next operation of the macro. In some embodiments, the received input may be recorded as the corresponding default value for that parameter operation.

D. The Macro Recommender

Figure 9:
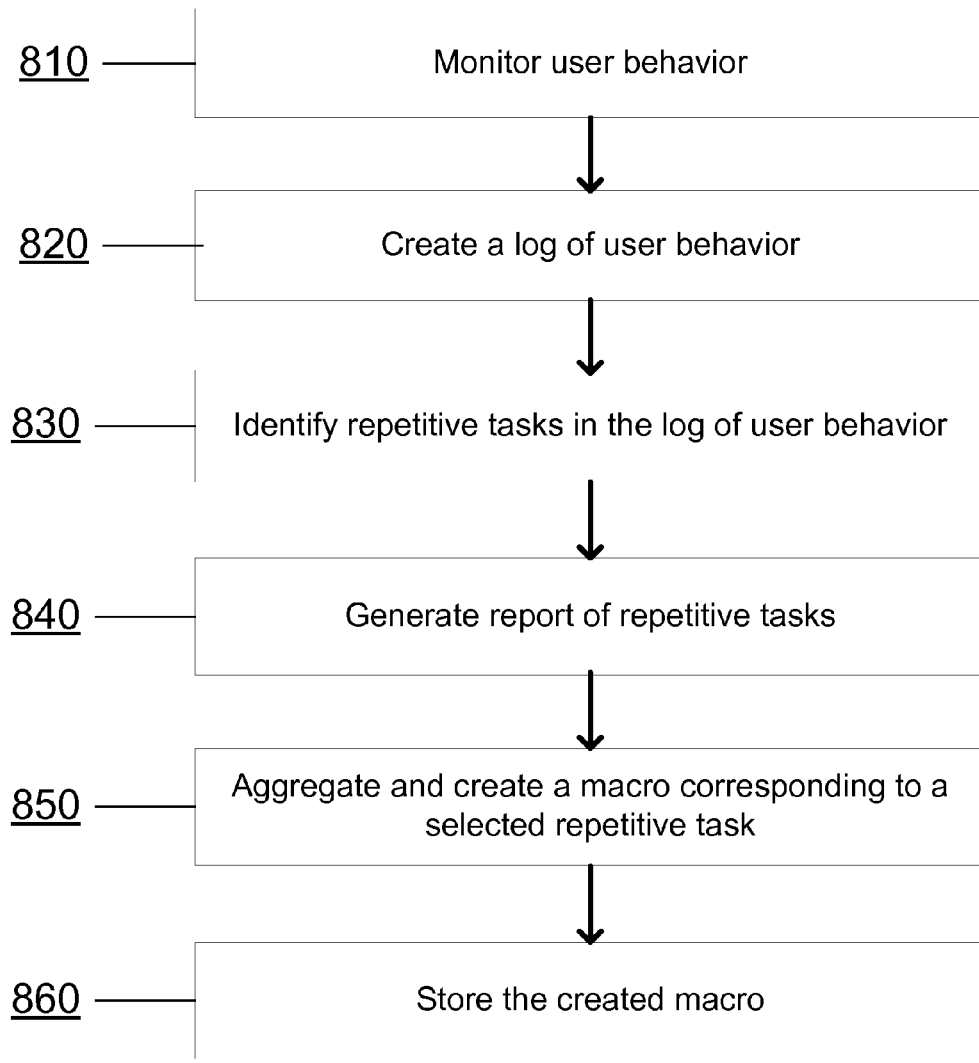
FIG. 9 illustrates a flow diagram of a process of recommending macros, according to an exemplary embodiment of the present invention.

The macro recommender 340 can analyze a history of user behavior and suggest macros for the user to create based on repetitive patterns of user behavior. FIG. 9 illustrates a flow diagram of a process of recommending macros, according to an exemplary embodiment of the present invention. In some embodiments, the macro recommender 340 can also monitor user activity and log a history of user interactions for immediate or later analysis. The macro recommender 340 can run as a background process on the target platform 300, and can be independent from the server application 315 on the target platform 300 in communication with the macro presenter 260. In some embodiments, the macro recommender 340 can automatically monitor user interactions to provide a history of user interactions, even when the macro recorder 320 is not activated.

In some embodiments, the macro recommender 340 can monitor 810 and log a history 820 of user behavior by capturing and logging user interactions as parameter and non-parameter operations. As with the macro recorder 320, each user interaction may be classified as a parameter operation or non-parameter operation based on the type of GUI element accessed during that interaction. The macro recommender 340 can suggest programmable macros without recording a default value or the state of the GUI element. In some embodiments, the history of user behavior can be logged in various other formats, for example and not limitation, a non-parameterized format that stores the necessary data to allow parameterization, i.e., converting a raw user action to a parameter operation, to occur at a later time.

The macro recommender 340 can analyze a history of user behavior to identify repetitive tasks 830. In some embodiments, the macro recommender 340 can identify repetitive parameter-related tasks that can become programmable macros. Repetitive tasks can be matching repetitive sequences of operations in a history of user behavior. In some embodiments, a repetitive task can be a matching sequence of a combination of operations, parameter values for parameter operations, and or other data. In an exemplary embodiment, the macro recommender 340 can use a suffix tree 922-924 to identify the longest-matching repetitive sequences.

Figure 10:
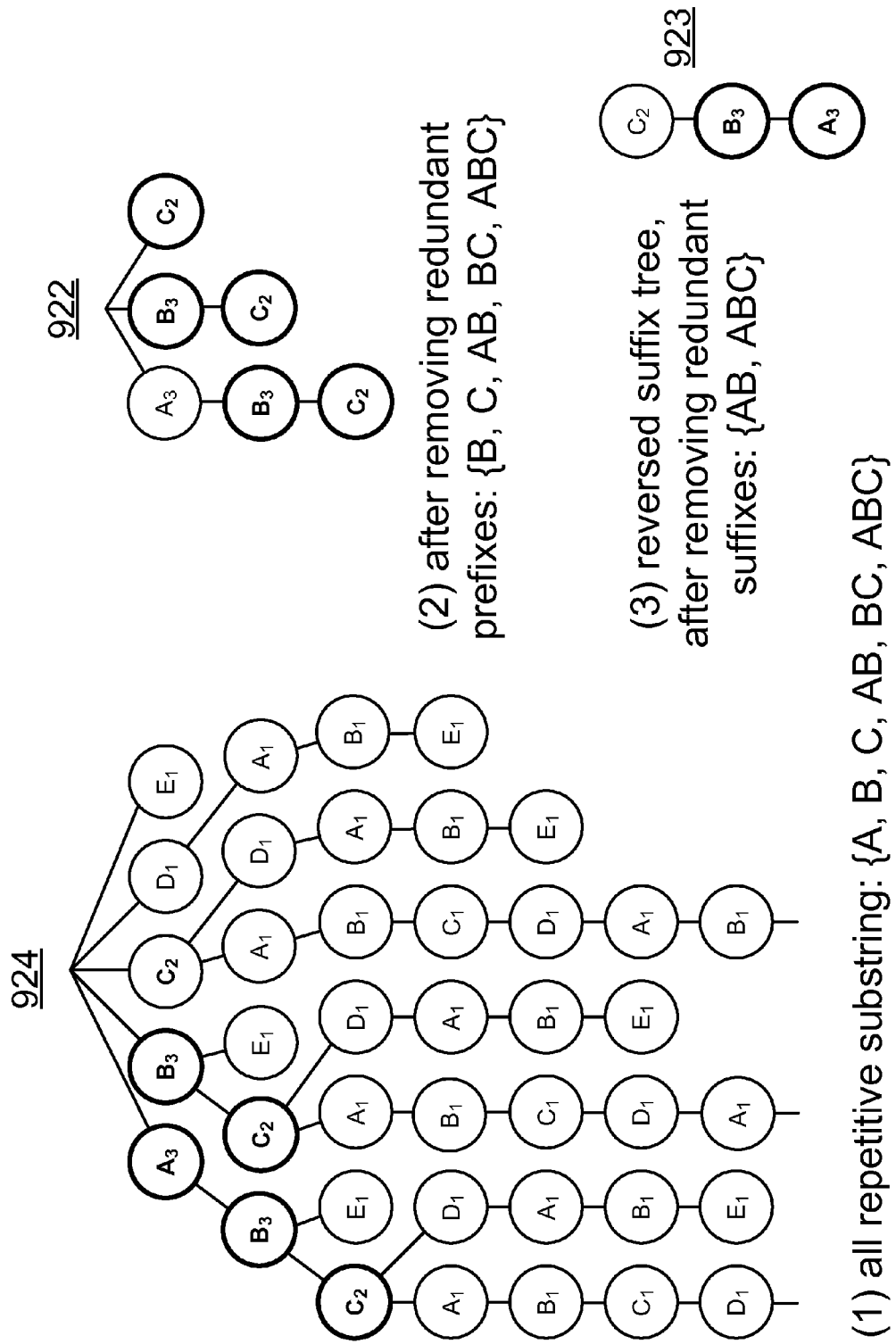
FIG. 10 illustrates a flow diagram of a process of identifying longest-matched subsequences, according to an exemplary embodiment of the present invention.

FIG. 10 illustrates a flow diagram of a process of identifying longest-matched subsequences, according to an exemplary embodiment of the present invention. FIG. 10 uses an example history of operations, "ABCABCDABE" to show the steps in determining all longest-matching repetitive sequences using a suffix tree. Each node in the suffix tree represents a sequence of operations and also the number of occurrences of the particular sequence, for example the leftmost "C2" in 921 represents that the sequence "ABC" appears twice. By traversing the suffix tree once, the macro recommender 340 can find all repeated sequences 924 (shown in bold). The macro recommender 340 can remove redundant patterns by filtering the longest-matching repetitive sequences from the found sequences 922. To do so, the macro recommender 340 can leverage the information stored in the suffix tree: "A" is a redundant prefix of "AB" since node "B3" has an equal number of occurrence as its parent "A3", which means "A" only appears as a sub-string of "AB" but not separately. The macro recommender 340 can remove redundant suffixes by establishing a reverse suffix tree and applying the same technique 923. In other embodiments, various solutions to the longest common substring problem can be used to identify repetitive tasks within a user behavior. The macro recommender 340 can keep track of the identified repetitive tasks and suggest the tasks to the user for macro creation.

In some embodiments, the macro recommender 340 can identify application-exclusive repetitive tasks, repetitive tasks spanning multiple applications, or both. For example, and not limitation, a task across applications identified by a macro recommender 340 might comprise opening a vCard in a first remote application 517, extracting an address from the vCard, then viewing the address in a second remote application such as Google® Maps™.

In some embodiments, the macro recommender 340 can generate a report of the identified repetitive tasks. The macro recommender can organize the report of repetitive tasks in rank order. The rank order can be based on various factors, including, for example, and not limitation, the length of repetitive tasks, the frequency of repetitive tasks, or both. The macro recommender can filter the report of repetitive tasks to include only repetitive tasks that contain at least a predetermined number of operations or that have occurred at least a predetermined number of times. In some embodiments, a predetermined number of operators can be three and a predetermined number of times can be two. The macro recommender can organize the report of repetitive tasks by remote software application.

In some embodiments, the macro recommender 340 can suggest a macro to a user on an on-demand basis. In other embodiments, the macro recommender 340 can suggest a macro to the user automatically, once a repetitive task has occurred a predetermined number of times.

E. The Macro Repository

To facilitate the interoperation of various components of the programmable macro system 100, the system may comprise a macro repository 400 capable of storing macros. The macro repository 400 can reside in persistent storage on the mobile device 200, on the target platform 300, or at another location local or remote to the two. In some embodiments, the macro repository 400 does not correspond to a single storage location; the macro repository 400 can be distributed over multiple storage locations, devices, and platforms. Various components of the programmable macro system 100 can store macros in and retrieve macros from the macro repository 400. In some embodiments, the macro repository 400 can store at least programmable macros, but non-programmable macros can be stored as well.

E. Suitable Computing Devices

FIG. 11 illustrates an architecture of a suitable target platform 300 or computing device 600 that can be used in the programmable macro system 100, according to an exemplary embodiment of the present invention. As mentioned above, one or more aspects of the programmable macro system 100 and related methods can be embodied, in whole or in part, in a computing device 600. For example, the target platform 300 can be provided in one or more computing devices 600, the macro repository 400 can be at least a part of one or more computing devices 600, and the mobile device 200 can be one or more computing devices 600 or a portion thereof.

Although specific components of a computing device 600 are illustrated in FIG. 11, the depiction of these components in lieu of others does not limit the scope of the invention. Rather, various types of computing devices 600 can be used to implement embodiments of the programmable macro system 100. Exemplary embodiments of the programmable macro system 100 can be operational with numerous other general purpose or special purpose computing system environments or configurations.

Exemplary embodiments of the programmable macro system 100 can be described in a general context of computer-executable instructions, such as one or more applications or program modules, stored on a computer-readable medium and executed by a computer processing unit. Generally, program modules can include routines, programs, objects, components, or data structures that perform particular tasks or implement particular abstract data types.

With reference to FIG. 11, components of the computing device 600 can comprise, without limitation, a processing unit 620 and a system memory 630. A system bus 621 can couple various system components including the system memory 630 to the processing unit 620.

The computing device 600 can include a variety of computer readable media. Computer-readable media can be any available media that can be accessed by the computing device 600, including both volatile and nonvolatile, removable and non-removable media. For example, and not limitation, computer-readable media can comprise computer storage media and communication media. Computer storage media can include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store data accessible by the computing device 600. For example, and not limitation, communication media can include wired media such as a wired network or direct-wired connection, and wireless media such as acoustic, RF, infrared and other wireless media. Combinations of any of the above can also be included within the scope of computer readable media.

The system memory 630 can comprise computer storage media in the form of volatile or nonvolatile memory such as read only memory (ROM) 631 and random access memory (RAM) 632. A basic input/output system 633 (BIOS), containing the basic routines that help to transfer information between elements within the computing device 600, such as during start-up, can typically be stored in the ROM 631. The RAM 632 typically contains data and/or program modules that are immediately accessible to and/or presently in operation by the processing unit 620. For example, and not limitation, FIG. 6 illustrates operating system 634, application programs 635, other program modules 636, and program data 637.

The computing device 600 can also include other removable or non-removable, volatile or nonvolatile computer storage media. By way of example only, FIG. 11 illustrates a hard disk drive 641 that can read from or write to non-removable, nonvolatile magnetic media, a magnetic disk drive 651 for reading or writing to a nonvolatile magnetic disk 652, and an optical disk drive 655 for reading or writing to a nonvolatile optical disk 656, such as a CD ROM or other optical media. Other computer storage media that can be used in the exemplary operating environment can include magnetic tape cassettes, flash memory cards, digital versatile disks, digital video tape, solid state RAM, solid state ROM, and the like. The hard disk drive 641 can be connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 11 can provide storage of computer readable instructions, data structures, program modules and other data for the computing device 600. For example, hard disk drive 641 is illustrated as storing an operating system 644, application programs 645, other program modules 646, and program data 647. These components can either be the same as or different from operating system 634, application programs 635, other program modules 636, and program data 637.

A web browser application program 635, or web client, can be stored on the hard disk drive 641 or other storage media. The web client 635 can request and render web pages, such as those written in Hypertext Markup Language ("HTML"), in another markup language, or in a scripting language.

A user of the computing device 600 can enter commands and information into the computing device 600 through input devices such as a keyboard 662 and pointing device 661, commonly referred to as a mouse, trackball, or touch pad. Other input devices (not shown) can include a microphone, joystick, game pad, satellite dish, scanner, electronic white board, or the like. These and other input devices are often connected to the processing unit 620 through a user input interface 660 coupled to the system bus 621, but can be connected by other interface and bus structures, such as a parallel port, game port, or a universal serial bus (USB). A monitor 691 or other type of display device can also be connected to the system bus 621 via an interface, such as a video interface 690. In addition to the monitor, the computing device 600 can also include other peripheral output devices such as speakers 697 and a printer 696. These can be connected through an output peripheral interface 695.

The computing device 600 can operate in a networked environment, being in communication with one or more remote computers 680 over a network. For example, and not limitation, each storage unit 190 can be in communication with the storage control 220 over a network. The remote computer 680 can be a personal computer, a server, a router, a network PC, a peer device, or other common network node, and can include many or all of the elements described above relative to the computing device 600, including a memory storage device 681.

When used in a LAN networking environment, the computing device 600 can be connected to the LAN 671 through a network interface or adapter 670. When used in a WAN networking environment, the computing device 600 can include a modem 672 or other means for establishing communications over the WAN 673, such as the internet. The modem 672, which can be internal or external, can be connected to the system bus 621 via the user input interface 660 or other appropriate mechanism. In a networked environment, program modules depicted relative to the computing device 600 can be stored in the remote memory storage device. For example, and not limitation, FIG. 11 illustrates remote application programs 617 as residing on a memory storage device 681. It will be appreciated that the network connections shown are exemplary and other means of establishing a communications link between the computers can be used.

As described, the programmable macro system 100 can aggregate user interactions inputted on a mobile device 200 in order to reduce the burden of accessing computing resources on the target platform 300. By reducing the number of user interactions required to complete a task, the programmable macro system 100 can provide increased efficiency in accessing remote computing resources from mobile devices.

In one exemplary embodiment of the present invention, the programmable macro system 100 can comprise a mobile application 210 associated with a mobile device 200; a client 240 running on the mobile device 200, associated with the mobile application 210, and in communication with a server 310 on a target platform 300; the target platform 300 remote from the mobile device 200 and comprising a server 310; and a macro recorder 320. The macro recorder 320 can be configured to record a first sequence of user interactions and create a first programmable macro, wherein creating the first programmable macro comprises: for each user interaction in the first sequence, retrieving a raw action comprising raw keyboard input or one or more mouse click locations; identifying a graphical user interface element accessed by the raw action; classifying the raw action as a parameter operation or a non-parameter operation based on the identified graphical user interface element, wherein a parameter operation is enabled to change the state of the identified graphical user interface element with a user-inputted value; and including the parameter operation or non-parameter operation in the first programmable macro. The macro 320 recorder can run at least partially on the target platform 300.

The programmable macro system 100 can comprise a macro player 330 configured to execute the first programmable macro on the target platform 300; pause the execution of the first programmable macro at a first parameter operation in the first programmable macro, to accept a user input from the mobile device 200; and resume execution of the first programmable macro with either a value entry in the user input or a default value of the first parameter operation. The macro player 330 can handle one or more exceptions arising during the execution.

The programmable macro system 100 can comprise a macro presenter 260 configured to display a control panel over at least a portion of the mobile application 210; retrieve a plurality of macros; present the plurality of macros to a user; and prompt the macro player 330 to execute a selected macro from the plurality of macros. The macro presenter 260 can direct the mobile application 210 to enlarge a region of interest during execution of the selected macro, and can direct the macro player 330 to pause or resume execution of the selected macro.

The programmable macro system 100 can comprise a macro recommender 340 configured to generate a report of identified repetitive tasks in a user activity log, wherein generating the report of identified repetitive tasks comprises: retrieving a raw action comprising raw keyboard input or one or more mouse click locations, identifying a graphical user interface element accessed by the raw action, and classifying the raw action as a parameter operation or a non-parameter operation based on the identified graphical user interface element, wherein a parameter operation is enabled to change the state of the identified graphical user interface element with a user-inputted value, all for each user interaction in a second sequence of user interactions; creating a user activity log comprising a sequence of the parameter operations and the non-parameter operations; identifying one or more repetitive tasks in the user activity log; and generating a report of the identified repetitive tasks. The macro recommender 340 can automatically record a sequence of user interactions, can run at least partially on the target platform 300 and independently of the server 310, and can run as background process on the target platform 300. A repetitive task can correspond to two or more matched sequences of user interactions in a remote application, can correspond to two or more matched sequences of user interactions across multiple remote applications. Repetitive tasks can be identified by matching sets of two or more sequences of operations from the user activity log, and can be identified by finding one or more longest-matched subsequences of operations from the user activity log using a suffix tree. The report of identified repetitive tasks can be rank-ordered based at least partially on a frequency of a repetitive task in the user activity log and a number of operations performed in the repetitive task, and can contain only repetitive tasks that contain a predetermined number of operations and have occurred a predetermined number of times.

The programmable macro system 100 can comprise a macro repository 400 configured to store the first programmable macro and the second programmable macro. The macro recorder can store the first programmable macro in the macro repository 400. The macro player 330 can execute the first programmable macro from the macro repository 400. The macro presenter can retrieve a plurality of macros from the macro repository 400. The macro recommender 340 can store a macro in the macro repository 400. The macro recommender 340 can be a second programmable macro corresponding to a selected repetitive task.

While the programmable macro system for improving the user experience of using mobile devices to access remote computing resources has been disclosed in exemplary forms, it will be apparent to those skilled in the art that many modifications, additions, and deletions may be made without departing from the spirit and scope of the system, method, and their equivalents, as set forth in the following claims.

The invention claimed is:

1. A system for providing access to a server on a target platform from a mobile device, the system comprising:
    a mobile application associated with the mobile device;
    a client running on the mobile device, associated with the mobile application, and in communication with the server on the target platform; and
    a macro recorder configured to record a first sequence of user interactions between the mobile device and the server, and further configured to create a first programmable macro, wherein creating the first programmable macro comprises, for each user interaction in the first sequence:
        retrieving a raw action comprising raw keyboard input or one or more mouse click locations;
        identifying a graphical user interface element accessed by the raw action;
        classifying the raw action as a parameter operation or a non-parameter operation based on the identified graphical user interface element, wherein a parameter operation is enabled to change the state of the identified graphical user interface element with a user-inputted value; and
        including the parameter operation or non-parameter operation in the first programmable macro.

2. The system of claim 1, further comprising a macro player configured to:
    execute the first programmable macro on the target platform;
    pause the execution of the first programmable macro at a first parameter operation in the first programmable macro, to accept a user input from the mobile device, and
    resume execution of the first programmable macro with either a value entry in the user input or a default value of the first parameter operation.

3. The system of claim 2, further comprising a macro presenter configured to:
    display a control panel over at least a portion of the mobile application; retrieve a plurality of macros;
    present the plurality of macros to a user; and
    prompt the macro player to execute a selected macro from the plurality of macros.

4. The system of claim 3, the macro presenter further configured to direct the mobile application to enlarge a region of interest during execution of the selected macro.

5. The system of claim 3, the macro presenter further configured to direct the macro player to pause or resume execution of the selected macro.

6. The system of claim 5, further comprising a macro recommender configured to generate a report of identified repetitive tasks in a user activity log, wherein generating the report of identified repetitive tasks comprises:
    for each user interaction in a second sequence of user interactions:
    retrieving a raw action comprising raw keyboard input or one or more mouse click locations;
    identifying a graphical user interface element accessed by the raw action;
    and classifying the raw action as a parameter operation or a non-parameter operation based on the identified graphical user interface element, wherein a parameter operation is enabled to change the state of the identified graphical user interface element with a user-inputted value;

creating a user activity log comprising a sequence of the parameter operations and the non-parameter operations; and identifying one or more repetitive tasks in the user activity log; and generating a report of the identified repetitive tasks.

7. The system of claim 6, the macro recommender further configured to automatically record the second sequence of user interactions.

8. The system of claim 7, wherein the repetitive tasks are identified by finding one or more longest-matched subsequences of operations from the user activity log using a suffix tree.

9. The system of claim 6, wherein the macro recorder stores the first programmable macro in a macro repository.

10. The system of claim 9, wherein the macro player executes the first programmable macro from the macro repository.

11. The system of claim 1, wherein the target platform is associated with a computing device remote from the mobile device, and wherein the mobile application provides remote access to one or more applications installed on the computing device.

12. The system of claim 1, the target platform being a cloud platform.

13. A system for providing access to a resource, the system comprising:

a macro player associated with a first computing device, the macro player configured to:

execute a programmable macro on a target platform;

classify the programmable macro as a parameter operation or a non-parameter operation based on a identified graphical user interface element, wherein a parameter operation is enabled to change the state of the identified graphical user interface element with a user-inputted value;

pause the execution of the programmable macro at a first parameter operation in the programmable macro, to accept a user input from the first computing device, and resume execution of the programmable macro with either a value entry in the user input or a default value of the first parameter operation.

14. The system of claim 13, the target platform being located remotely from the first computing device, wherein the macro player executes a macro remotely on the target platform based on the user input from the first computing device.

15. The system of claim 14, the macro player being associated with a local software application on the first computing device and a remote software application on the target platform, wherein the user input is received in the local software application, and the macro player is configured to execute the programmable macro in the remote application on the target platform based on user input.

16. The system of claim 13, the macro player further configured to execute the programmable macro on the target platform, wherein the mobile application is responsive to a first user interaction during the execution.

17. The system of claim 13, further comprising a macro repository configured to store the programmable macro, wherein the macro player executes the programmable macro from the macro repository.

18. The system of claim 13, further comprising a macro presenter configured to:

display a control panel over at least a portion of the mobile application;

retrieve a plurality of macros;

present the plurality of macros to a user; and prompt the macro player to execute a selected macro from the plurality of macros.

19. The system of claim 18, the macro presenter further configured to direct the mobile application to enlarge a region of interest during execution of the selected macro.

20. The system of claim 18, the macro presenter further configured to direct the macro player to pause or resume execution of the selected macro.

21. The system of claim 18, further comprising a macro repository configured to store the programmable macro, wherein the macro presenter retrieves a plurality of macros from the macro repository.

22. A method for providing access to a server on a target platform from a mobile device, a mobile application being associated with the mobile device, and a client that is running on the mobile device being associated with the mobile application and being in communication with the server on the target platform, the method configured to:

record a first sequence of user interactions between the mobile device and the server, and further configured to create a first programmable macro, wherein creating the first programmable macro comprises, for each user interaction in the first sequence:

retrieving a raw action comprising raw keyboard input or one or more mouse click locations;

identifying a graphical user interface element accessed by the raw action;

classifying the raw action as a parameter operation or a non-parameter operation based on the identified graphical user interface element, wherein a parameter operation is enabled to change the state of the identified graphical user interface element with a user-inputted value; and including the parameter operation or non-parameter operation in the first programmable macro.

23. A method for providing access to a resource, wherein a macro player is associated with a first computing device, the macro player configured to:

execute a programmable macro on a target platform;

classify the programmable macro as a parameter operation or a non-parameter operation based on a identified graphical user interface element, wherein a parameter operation is enabled to change the state of the identified graphical user interface element with a user-inputted value;

pause the execution of the programmable macro at a first parameter operation in the programmable macro, to accept a user input from the first computing device, and resume execution of the programmable macro with either a value entry in the user input or a default value of the first parameter operation.

* * * * *